(12) United States Patent
Liu (10) Patent No.: US 8,562,936 B2
(45) Date of Patent: Oct. 22, 2013

(54) CARBON NANOTUBE ARRAY STRUCTURE AND METHOD FOR MAKING THE SAME

(75) Inventor: Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 122 days.

(21) Appl. No.: 12/915,263

(22) Filed: Oct. 29, 2010

(65) Prior Publication Data

US 2011/0230373 A1    Sep. 22, 2011

(30) Foreign Application Priority Data

Mar. 18, 2010 (CN) .......................... 2010 1 0127203

(51) Int. Cl.
*D01F 9/12* (2006.01)
*D01F 9/10* (2006.01)

(52) U.S. Cl.
USPC ............... 423/447.3; 423/447.1; 977/742; 977/842

(58) Field of Classification Search
USPC ............... 423/447.1, 447.2, 447.3, 445 B; 977/742–754, 842–848; 428/367
See application file for complete search history.

(56) References Cited

U.S. PATENT DOCUMENTS

| | | | |
|---|---|---|---|
| 6,038,060 A * | 3/2000 | Crowley | .................. 359/328 |
| 7,288,321 B2 | 10/2007 | Liu et al. | |
| 2004/0101468 A1 * | 5/2004 | Liu et al. | .................. 423/447.3 |
| 2004/0136896 A1 * | 7/2004 | Liu et al. | .................. 423/447.3 |
| 2007/0148530 A1 | 6/2007 | Lin et al. | |
| 2007/0292614 A1 * | 12/2007 | Liu et al. | .................. 427/249.1 |
| 2008/0095695 A1 * | 4/2008 | Shanov et al. | .................. 423/447.3 |
| 2009/0160799 A1 * | 6/2009 | Jiang et al. | .................. 345/173 |
| 2009/0297732 A1 | 12/2009 | Jiang et al. | |

FOREIGN PATENT DOCUMENTS

| | | |
|---|---|---|
| CN | 1502553 | 6/2004 |
| CN | 101591015 | 12/2009 |
| JP | 2005-60131 | 3/2005 |
| JP | 2005-239494 | 9/2005 |
| JP | 2007-169155 | 7/2007 |

* cited by examiner

*Primary Examiner* — Daniel C McCracken (74) *Attorney, Agent, or Firm* — Altis & Wispro Law Group, Inc.

(57) ABSTRACT

The present disclosure relates to a carbon nanotube array structure and a method for making the same. The carbon nanotube array structure includes a bendable flexible substrate and a carbon nanotube array. The flexible substrate has at least one surface. The carbon nanotube array is grown on at least one surface of the flexible substrate. In the method for making the carbon nanotube array structure, a reacting chamber, and a bendable flexible substrate with at least one surface are provided. The flexible substrate is disposed in the reacting chamber and heated to a certain temperature. A carbon source gas is supplied into the reacting chamber, thereby forming a carbon nanotube array on the catalyst layer.

12 Claims, 6 Drawing Sheets

CARBON NANOTUBE ARRAY STRUCTURE AND METHOD FOR MAKING THE SAME

CROSS-REFERENCE TO RELATED APPLICATIONS

This application claims all benefits accruing under 35 U.S.C. §119 from China Patent Application No. 201010127203.9, filed on Mar. 18, 2010, in the China Intellectual Property Office, the disclosure of which is incorporated herein by reference. This application is related to commonly-assigned application Ser. No. 12/952,402, entitled, "METHOD FOR MAKING CARBON NANOTUBE FILM", filed on Nov. 23, 2010; Ser. No. 12/952,396, entitled, "METHOD FOR MAKING CARBON NANOTUBE STRUCTURE", filed on Nov. 23, 2010.

BACKGROUND

1. Technical Field

The present disclosure relates to a carbon nanotube array structure and a method for making the same.

2. Description of Related Art

A carbon nanotube array can be grown on a flat silicon wafer by a chemical vapor deposition (CVD) method. More specifically, a layer of nanosized catalyst grains is arranged on the flat silicon wafer by annealing a metal film deposited on the wafer. The wafer is then heated in a reactor chamber. Carbon source gas and protective gas are introduced into the reactor chamber and the carbon source gas is pyrolyzed by an action of the catalyst grains at elevated temperature to grow the carbon nanotube array on the flat silicon wafer. However, the area of the flat silicon wafer is restricted by the size of the reactor chamber, accordingly, the area of the carbon nanotube array grown on the flat silicon wafer is restricted by the area of the flat silicon wafer.

Recently, a method for growing a large-area carbon nanotube film is disclosed by the patent application US20070292614 A1 to Liu et al. The method includes steps of:

providing a rigid substrate with a curved surface;

forming a catalyst layer on the curved surface of the substrate;

fixing the substrate in a reactor chamber; and growing a carbon nanotube film on the curved surface of the substrate by the CVD process.

A shape of the curved surface of the substrate can be cylindrical, helical, or another shape. The flat silicon wafer and the substrate with the curved surface can be accommodated in the same reactor chamber, and can have different surface areas for the carbon nanotubes to grow thereon, wherein the curved surface of the substrate is larger than the flat surface of the flat silicon wafer. Therefore, a larger carbon nanotube film can be achieved by using the substrate with the curved surface without increasing the size of the reactor chamber or a diameter of a tube furnace.

However, in the above method, the substrate with the curved surface is made of a rigid material. Compared with the carbon nanotube array grown on the flat silicon wafer, the carbon nanotube film grown on the curved surface of the substrate is not convenient to be used in practice. For example, the carbon nanotube film grown on a central portion of a helical shaped substrate is difficult to be used.

What is needed, therefore, is to provide a carbon nanotube array structure with a large area and a method for making the same, wherein the carbon nanotube array structure is convenient to be used.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
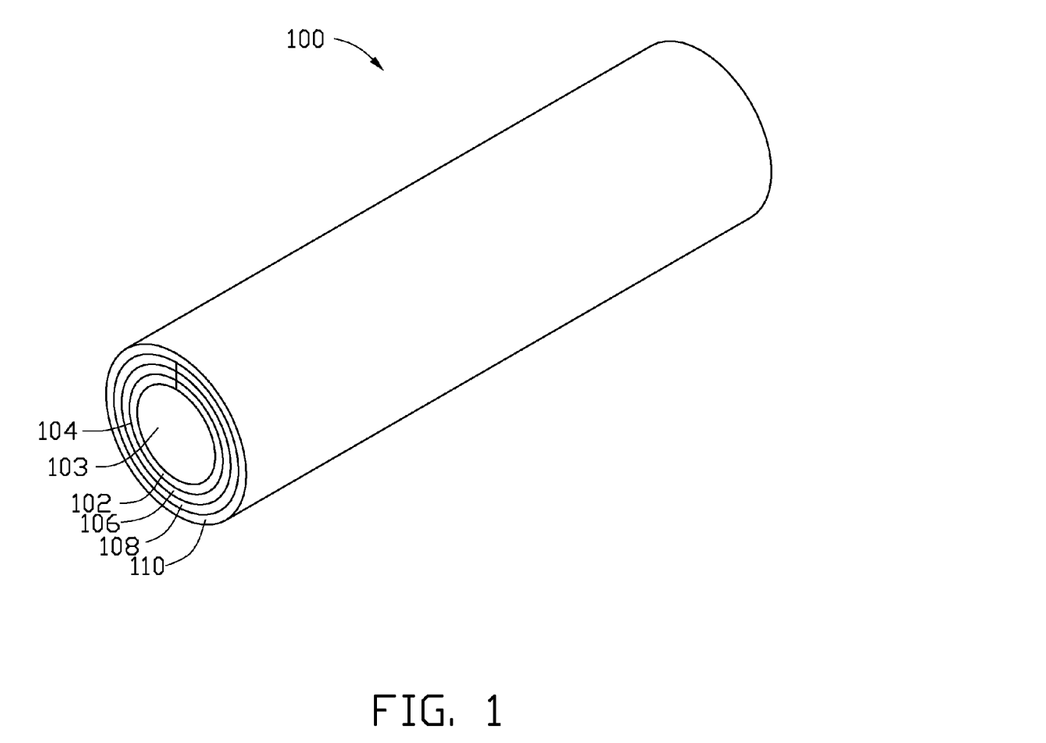
FIG. 1 is a schematic structural view of an embodiment of a carbon nanotube array structure.

Referring to FIG. 1, an embodiment of a carbon nanotube array structure 100 includes a bendable plane shaped flexible substrate 102 with at least one surface 104, and at least one carbon nanotube array 110 grown on the at least one surface 104.

The flexible substrate 102 can be made of a heat-resistant material, which can bend and support the carbon nanotube array 110.

A melting point of the flexible substrate 102 is greater than a growing temperature of the carbon nanotube array 110. In one embodiment, the melting point of the flexible substrate 102 is greater than about 500 degrees Celsius. The flexible substrate 102 has a small thickness, and has a sheet-like shape. Specifically, the material of the flexible substrate 102 can be metal, quartz, silicon, or ceramic. The metal can be molybdenum (Mo), titanium (Ti), zirconium (Zr), columbium (Nb), tantalum (Ta), hafnium (Hf), tungsten (W), vanadium (V), stainless steel, or any alloy thereof. In one embodiment, the surface 104 of the flexible substrate 102 is a smooth surface.

The flexible substrate 102 has flexibility and can be elastically or plastically deform under an external force. If the deformation is elastic, the flexible substrate 102 can return to its original unbent shape when the external force is removed. If the deformation is plastic, the flexible substrate 102 can remain in its bent shape when the external force is removed. The bent flexible substrate 102 with the plastic deformation can return to its original unbent shape without fracture by applying another external force. The flexible substrate 102 can be bent into various shapes, such as a tubular, helical Z-shape, and U-shape. The tubular shaped flexible substrate 102 may have a closed sidewall or an opened sidewall having a linear shaped opening. An extending direction of the opening is approximately parallel to the length direction of the tubular shaped flexible substrate 102, and extends through the entire length of the tubular shaped flexible substrate 102. Specifically, if the tubular shaped flexible substrate 102 has the closed sidewall, a profile of the cross section of the tubular shaped flexible substrate 102 may be round, oval, triangle, rectangle, pentagon, hexagon, or other regular or irregular polygons. If the tubular shaped flexible substrate 102 has the opened sidewall with the opening, the profile of the cross section of the tubular shaped flexible substrate 102 may be an unclosed round, unclosed oval, unclosed triangle, unclosed rectangle, unclosed pentagon, unclosed hexagon, or other unclosed regular or irregular polygons. If the flexible substrate 102 is bent into a helical shape, a U-shape, or a Z-shape, correspondingly, a profile of the cross section of the bent flexible substrate 102 has a helical line shape, a U-shape, or a Z-shape.

In addition, a thickness of the flexible substrate 102 can be set to ensure that the flexible substrate 102 can be bent without fracture. The smaller the thickness of the flexible substrate 102, the greater the flexible substrate 102 can be bent. If the flexible substrate 102 is a metal or an alloy slice, the thickness of the flexible substrate 102 can be smaller than or equal to 3 millimeters (mm) and greater than or equal to 0.005 mm. If the flexible substrate 102 is a silicon slice, quartz slice, or ceramic slice, the thickness of the flexible substrate 102 can be smaller than or equal to 0.3 mm. In one embodiment, the thickness of the flexible substrate 102 is smaller than or equal to 0.1 mm and greater than or equal to 1 micrometer (μm). In one embodiment, the flexible substrate 102 is a metal slice with 0.1 mm thickness.

The carbon nanotube array 110 includes a plurality of carbon nanotubes. The carbon nanotubes may be disorderly aligned or orderly aligned to be substantially perpendicular to the surface 104 of the flexible substrate 102. The disorderly aligned carbon nanotubes may be curly and wound around each other. The orderly aligned carbon nanotubes are substantially straight and may be substantially parallel to each other if the flexible substrate 102 is flat. The carbon nanotubes being substantially parallel to each other means that a large number of carbon nanotubes are arranged substantially along the same direction, and a small number of the carbon nanotubes may be randomly arranged, and has a small if not negligible effect on the larger number of carbon nanotubes. The orderly aligned carbon nanotubes do not need to be exactly perpendicular to the surface 104 of the flexible substrate 102, but are substantially perpendicularly from a general view.

Furthermore, the carbon nanotube array structure 100 may include a catalyst layer 108 disposed between the surface 104 of the flexible substrate 102 and the carbon nanotube array 110. Namely, the carbon nanotube array 110 is formed on the catalyst layer 108. A material of the catalyst layer 108 can be iron (Fe), cobalt (Co), nickel (Ni), or any alloy thereof. The catalyst layer 108 can be formed on the surface 104 by thermochemical deposition, electron beam deposition, magnetron sputtering, or evaporating. A thickness of the catalyst layer 108 is determined by actual needs and can be in a range from about 1 nanometer (nm) to about 50 nm. In one embodiment, the catalyst layer 108 is a Fe layer with a thickness of about 5 nm.

In addition, if the flexible substrate 102 is a metal slice, the carbon nanotube array structure 100 may further include an obstruct layer 106 disposed between the flexible substrate 102 and the catalyst layer 108. A material of the obstruct layer 106 can be silicon, silicon nitride, silicon oxide, or metallic oxide. The obstruct layer 106 may have a thickness smaller than or equal to about 100 μm. In one embodiment, the obstruct layer 106 is a silicon layer with a thickness of about 50 nm.

The carbon nanotube array structure 100 can be a plane structure, and can be bent into a tubular shape, helical shape, U-shape, Z-shape, or other regular or irregular shape. In one embodiment, the carbon nanotube array structure 100 is bent into a tubular shape as shown in FIG. 1. The carbon nanotube array structure 100 can be bent into any desired shape thereby enlarging an applied range of the carbon nanotube array structure 100.

Figure 2:
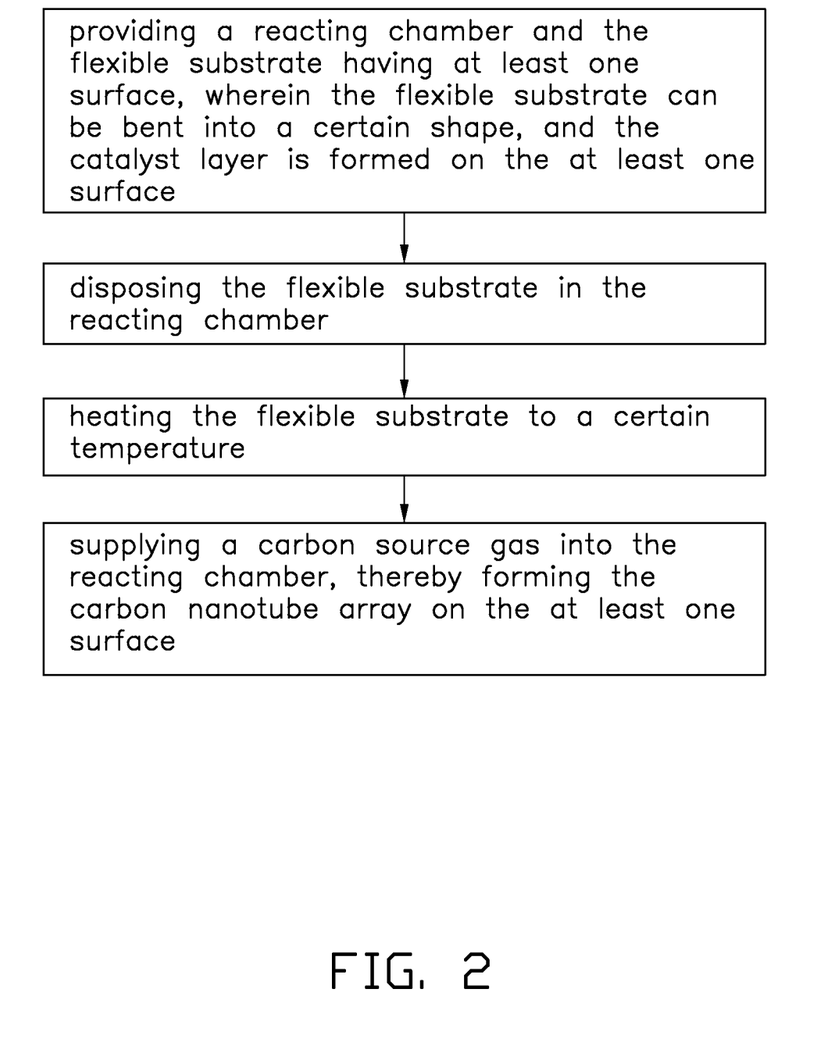
FIG. 2 is a flow chart of an embodiment of a method for making the carbon nanotube array structure of FIG. 1.
Figure 3:
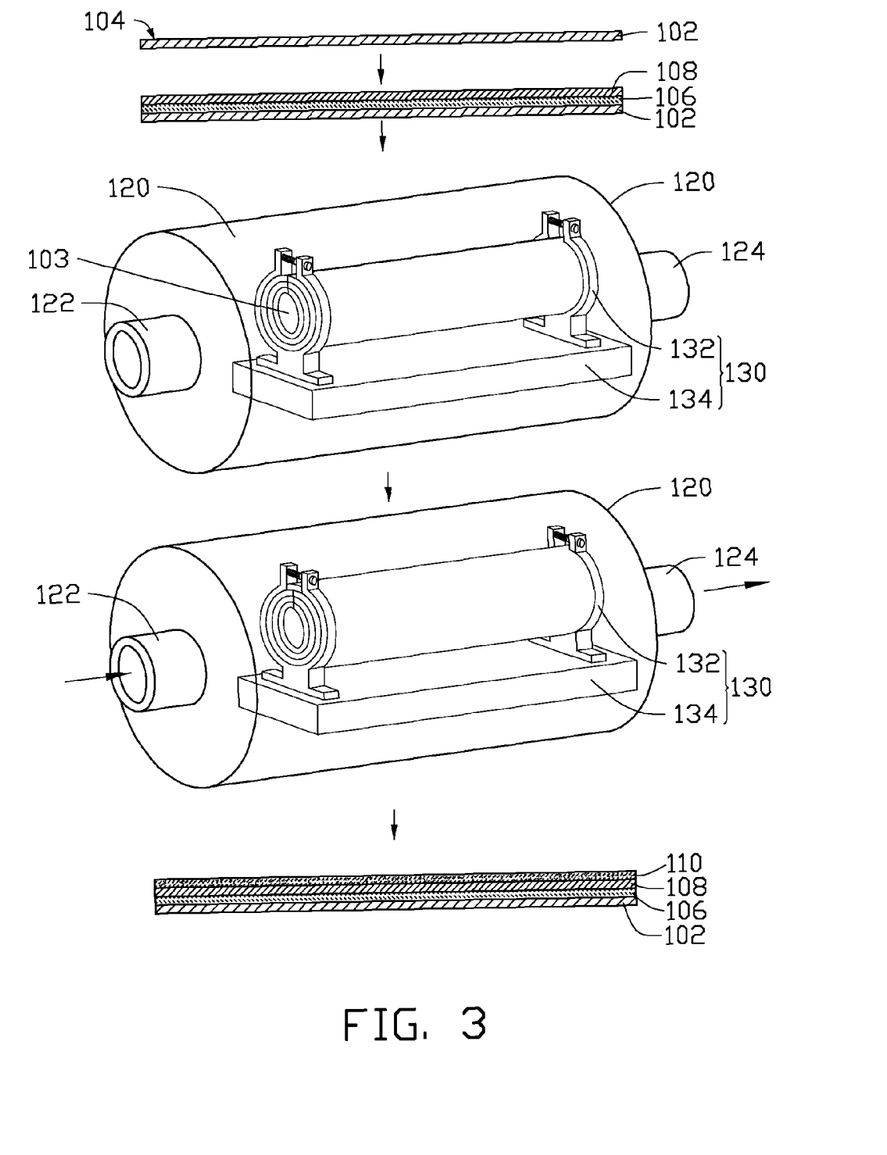
FIG. 3 is a schematic view of the method of FIG. 2.

Referring to FIGS. 2 and 3, a method for making the carbon nanotube array structure 100 includes the following steps of:

S1, providing a reacting chamber 120 and the flexible substrate 102 having at least one surface 104, wherein the flexible substrate 102 can be bent into a certain shape, and the catalyst layer 108 is formed on the at least one surface 104;

S2, disposing the flexible substrate 102 in the reacting chamber 120;

S3, heating the flexible substrate 102 to a certain temperature; and

S4, supplying a carbon source gas into the reacting chamber 120, thereby forming the carbon nanotube array 110 on the at least one surface 104.

In step S1, the reacting chamber 120 can be a quartz tube furnace. The reacting chamber 120 includes a gas inlet 122 and a gas outlet 124 located on two opposite ends along an axis of the reacting chamber 120. In one embodiment, the surface 104 of the flexible substrate 102 is a smooth surface. The smooth surface can be formed by mechanical polishing or electrochemical polishing.

The catalyst layer 108 can be formed on the surface 104 by electron beam deposition, vacuum evaporation, or magnetron sputtering. Furthermore, the catalyst layer 108 can be annealed.

In addition, if the flexible substrate 102 is a metal slice, an obstruct layer 106 may be further formed on the surface 104 before forming the catalyst layer 108. The obstruct layer 106 can be fabricated by magnetron sputtering or vacuum evaporation. The obstruct layer 106 can avoid a reaction between the metal slice and the carbon source gas for forming amorphous carbon, and prevent a fusion between the catalyst layer 108 and the flexible substrate 102. In one embodiment, the obstruct layer 106 is formed by magnetron sputtering.

In step S2, the flexible substrate 102 can be further bent into a shape that can be accommodated in an inner space of the reaction chamber 120. In one embodiment, the bent flexible substrate 102 defines a through hole 103.

Furthermore, a supporting device 130 can be provided. The flexible substrate 102 can be supported by the supporting device 130. The flexible substrate 102 supported by the supporting device 130 can be disposed in the reacting chamber 120. The supporting device 130 includes a supporting bracket 132. A structure of the supporting bracket 132 is not limited. The supporting bracket 132 can support the bent flexible substrate 102 so that the bent flexible substrate 102 can be suspended in the reacting chamber 120 and uniformly heated.

Specifically, the step S2 further includes the following substeps of:

S21, bending the flexible substrate 102 into a certain shape under external force; and S22, disposing the bent flexible substrate 102 in the reacting chamber 120.

In substep S21, the flexible substrate 102 is bent from an original shape (e.g., flat shape) to the certain shape (e.g., curved shape). The certain shape of the bent flexible substrate 102 insures that the bent flexible substrate 102 can be accommodated in the reacting chamber 120. The certain shape may be a tubular shape, helical shape, Z-shape, or other regular or irregular shape. In one embodiment, the flexible substrate 102 is bent to form a cylindrical shape. The cylindrical shaped flexible substrate 102 can define a through-hole 103. The through hole 130 extends from one end to another opposite end of the flexible substrate 102.

Figure 4:
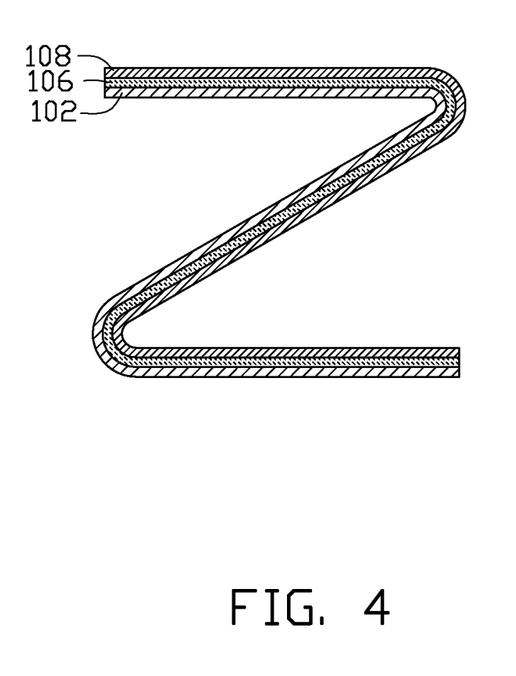
FIG. 4 is a cross sectional view of an embodiment of a flexible substrate which is bent into a "Z" shaped structure.

Referring to FIG. 4, in one embodiment, the flexible substrate 102 is bent under an external force and retains the bent shape by itself when the external force is removed, for example, the metal slice can be bent into and retain the Z-shape. The bent flexible substrate 102 is disposed on the supporting bracket 132. The flexible substrate 102 disposed on the supporting bracket 132 is disposed in the reacting chamber 120.

In another embodiment, the flexible substrate 102 automatically recovers the original shape after removing the external force. To keep the certain shape of the flexible substrate 102, the supporting device 130 can further include a fixture frame 134. The fixture frame 134 can be fixed on the bent flexible substrate 102 before disposing the flexible substrate 102 in the reacting chamber 120 to hold the certain shape of the flexible substrate 102. Accordingly, the flexible substrate 102 can retain the bent shape by the fixture frame 134. The supporting bracket 132 can support the fixture frame 134. A shape and a disposition of the fixture frame 134 are not limited, and can be set according to the shape of the bent flexible substrate 102. The fixture frame 134 should obstruct as little heat as possible when the flexible substrate 102 is heated in the step S3.

In one embodiment, the flexible substrate 102 is bent into a cylinder shaped structure. The flexible substrate 102 with the cylinder shaped structure defines the through hole 103. The supporting device 130 includes the supporting bracket 132 and a fixture frame 134 disposed on the supporting bracket 132. The fixture frame 134 includes two metal rings with an annular cross section. The flexible substrate 102 is fixed in the two metal rings, namely, the two metal rings enclose the flexible substrate 102 with the cylinder shaped structure. The two metal rings are substantially parallel to each other and disposed on two ends along a length direction of the flexible substrate 102. Thus, a middle portion of the flexible substrate 102 is not coated by the fixture frame 134.

In substep S22, in one embodiment, the flexible substrate 102 is disposed along an axis of the reacting chamber 120. A bent direction of the flexible substrate 102 can be a direction around an axis of the reacting chamber 120. Two ends of the through hole 103 face the gas inlet 122 and the gas outlet 124. Thus, little carbon source gas is obstructed by the flexible substrate 102, thereby avoiding decreasing a growth speed of the carbon nanotubes. The bent flexible substrate 102 can effectively utilize the space of the reacting chamber 120. Thus, a flexible substrate 102 with a large area can be accommodated in the reacting chamber 120, thereby correspondingly forming a carbon nanotube array 110 with a large area.

In addition, a thickness of the flexible substrate 102 can be set according to a diameter of the reacting chamber 120. In one embodiment, the diameter of the reacting chamber 120 ranges from about 280 millimeter (mm) to about 300 mm. If the flexible substrate 102 is a metal slice, the thickness of the metal slice can be less than or equal to 1 mm. If the flexible substrate 102 is a silicon slice, a quartz slice, or a ceramic slice, the thickness of the flexible substrate 102 can be less than or equal to 0.3 mm and greater than or equal to 1 μm.

In step S3, if air is in the reacting chamber 120, the air can be expelled out before heating the flexible substrate 102 to a certain temperature, thereby avoiding inducing reaction between the carbon source gas and the air.

The air can be expelled out from the reacting chamber 120 by at least one of the following steps: M1, evacuating the air in the reacting chamber 120 by an evacuating device; M2, inputting a protective gas into the reacting chamber 120 to expel out the air; or M3, evacuating the air in the reacting chamber 120 by an evacuating device while flowing a protective gas into the reacting chamber 120 to achieve a certain gas pressure.

In one embodiment, the air is expelled out from the reacting chamber 120 by the step M3. Specifically, the protective gas is inputted into the reacting chamber 120 from the gas inlet 122. The protective gas cannot react with the carbon source gas. The protective gas can be argon gas, nitrogen gas, or helium gas. The catalyst layer 108 on the surface 104 of the flexible substrate 102 is heated to a growing temperature of the carbon nanotubes. In one embodiment, the growing temperature is in a range from about 500 degrees Celsius to about 800 degrees Celsius.

In step S4, the carbon source gas can be ethene, methane, ethane, ethyne, or other hydrocarbon. In one embodiment, the carbon source gas is ethene. The carbon source gas is inputted into the reacting chamber for about 10 minute to about 2 hours.

Specifically, the carbon source gas and the protective gas are flowed into the reacting chamber 120 from the gas inlet 122 with a certain volume ratio and a certain input rate. Meanwhile, the carbon source gas and the protective gas are leaving the reacting chamber 120 from the gas outlet 124 at a certain output rate which is about the same as the input rate of the carbon source gas and the protective gas. Thus, the carbon source gas can continuously flow in the reacting chamber 120, can renew on schedule, and during which, the concentration of the carbon source gas and the protective gas in the reacting chamber 120 can remain unchanged. Specifically, the volume ratio of the carbon source gas to the protective gas can be in a range from about 1:0 to about 1:10. The input rate of the protective gas and the carbon source gas can be set as dimension of the reacting chamber 120.

After forming the carbon nanotube array 110, the flexible substrate 102 is taken out from the reacting chamber 120. Subsequently, the flexible substrate 102 is unbent to form a flat structure, thereby forming a flat carbon nanotube array structure 100.

The flexible substrate 102 can be bent into a structure to be accommodated in the reacting chamber 120, and the bent flexible substrate 102 can be unbent after forming the carbon nanotube array.

Figure 5:
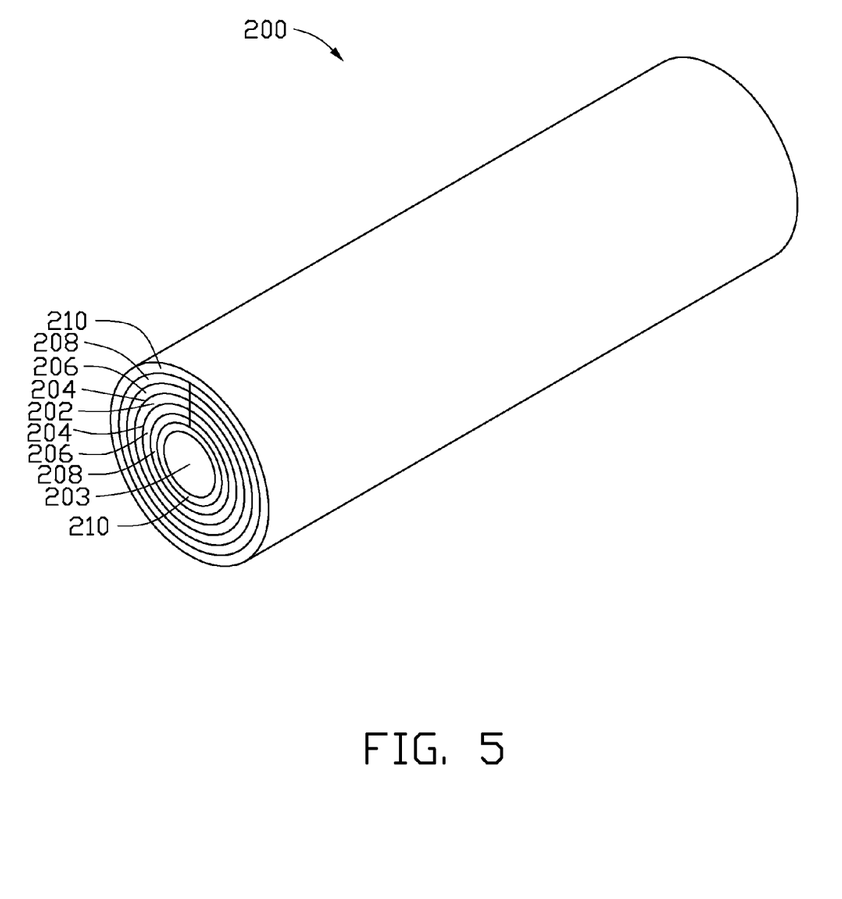
FIG. 5 is a schematic structural view of another embodiment of a carbon nanotube array structure.

One embodiment of a carbon nanotube array structure 200 includes a flexible substrate 202 with two opposite surfaces 204. An obstruct layer 206, a catalyst layer 208 and a carbon nanotube array 210 are successively formed on each of the surfaces 204.

Figure 6:
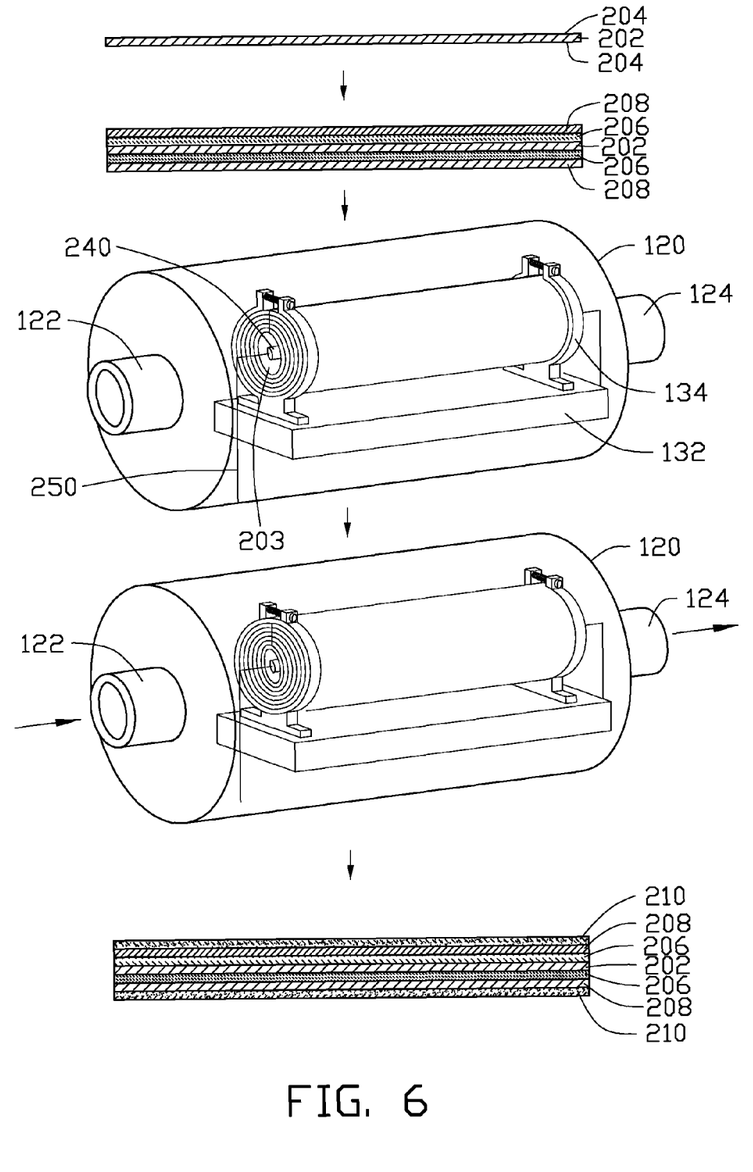
FIG. 6 is a schematic view of another embodiment of a method for making the carbon nanotube array structure of FIG. 5.

Referring to FIG. 6, one embodiment of a method for making the carbon nanotube array structure 200 includes steps B1 through B4, wherein the step B3 and step B4 are the same as the step S3 and step S4 of the above embodiment, but the step B1 and B2 is different from the step S1 and step S2 of the above embodiment.

In the step B1, an obstruct layer 206, a catalyst layer 208, and a carbon nanotube array 210 are successively formed on each of the surfaces 204.

In step B2, the flexible substrate 202 is bent into a tubular structure defining a through hole 203. A heating device 240 may be further provided and disposed in the through hole 203 from one end of the through-hole 203 after disposing the flexible substrate 202 in the reacting chamber 120. The heating device 240 can ensure that the flexible substrate 202 is uniformly heated. The heating device 240 can be a resistance heating tube, infrared heating tube, or silicon-molybdenum heating rod. In one embodiment, the heating device is the infrared heating tube. Two ends of the infrared heating tube are clamped by a holder 250, thereby being fixed in the through-hole 203. One surface of the flexible substrate 202 is directly heated by the quartz tube furnace, and another surface of the flexible substrate 202 is directly heated by the heating device 240. Thus, the carbon nanotube array 210 can be uniformly formed on two surfaces 204 of the flexible substrate 202.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a carbon nanotube array structure, the method comprising:
   providing a reacting chamber and a bendable flexible substrate having at least one surface, wherein the flexible substrate is bent into a certain shape, and a catalyst layer is formed on the at least one surface of the flexible substrate;
   disposing the flexible substrate with the catalyst layer in the reacting chamber;
   heating the flexible substrate to a certain temperature;
   supplying a carbon source gas into the reacting chamber, thereby forming a carbon nanotube array on the catalyst layer; and
   removing the flexible substrate with the carbon nanotube array formed on the catalyst layer from the reacting chamber and bending the flexible substrate into a flat shape.

2. The method as claimed in claim 1, wherein the certain shape is cylinder shaped, helical shaped, U-shaped, or Z-shaped.

3. The method as claimed in claim 1, wherein the flexible substrate defines a through hole extending along an axis of the reacting chamber.

4. The method as claimed in claim 3, further comprising providing a heating device located in the through hole to heat the flexible substrate.

5. The method as claimed in claim 1, further comprising forming an obstruct layer between the at least one surface of the flexible substrate and the catalyst layer.

6. The method as claimed in claim 1, wherein a melting temperature of the flexible substrate is greater than about 500 degrees Celsius.

7. The method as claimed in claim 1, wherein a thickness of the flexible substrate is smaller than or equal to about 3 mm.

8. The method as claimed in claim 1, wherein a material of the flexible substrate is selected from the group consisting of molybdenum, zirconium, columbium, tantalum, hafnium, tungsten, vanadium, and any alloy thereof.

9. The method as claimed in claim 5, wherein the obstruct layer is capable of preventing a fusion between the catalyst layer and the flexible substrate.

10. The method as claimed in claim 5, wherein a thickness of the obstruct layer is less than or equal to about 100 μm.

11. The method as claimed in claim 5, wherein a material of the obstruct layer is selected from the group consisting of silicon nitride, silicon oxide, and metallic oxide.

12. The method as claimed in claim 1, wherein the carbon nanotube array comprises a plurality of carbon nanotubes aligned along a direction substantially perpendicular to the at least one surface of the flexible substrate.

* * * * *